J. J. & K. O'MALLEY.
CONVERTIBLE AUTOMOBILE SEAT STRUCTURE.
APPLICATION FILED MAY 21, 1917.

1,278,989. Patented Sept. 17, 1918.

WITNESSES
C. L. Wadl.
H. W. Chase.

INVENTORS,
Joseph J. O'Malley &
Katherine O'Malley
By R. S. Caldwell
ATTORNEY

UNITED STATES PATENT OFFICE.

JOSEPH J. O'MALLEY AND KATHERINE O'MALLEY, OF MILWAUKEE, WISCONSIN.

CONVERTIBLE AUTOMOBILE-SEAT STRUCTURE.

1,278,989.  Specification of Letters Patent.  Patented Sept. 17, 1918.

Application filed May 21, 1917. Serial No. 169,947.

*To all whom it may concern:*

Be it known that we, JOSEPH J. O'MALLEY and KATHERINE O'MALLEY, citizens of the United States, and residents of Milwaukee, Milwaukee county, Wisconsin, have invented new and useful Improvements in Convertible Automobile-Seat Structures, of which the following is a description, reference being had to the accompanying drawings, which are a part of this specification.

The present invention relates to new and useful improvements in automobile bodies wherein the seat portions thereof are convertible to form beds.

It is in general the object of this invention to provide an automobile body having convertible seat portions which may be most readily manipulated to form a bed, and which are of exceedingly simple and durable construction.

We contemplate using the seat cushions as the mattress of the bed, and it is more specifically our object to provide an uninterrupted expanse of said cushions when used as a mattress, to promote maximum comfort.

A further object resides in the provision of an arrangement whereby the back of the front seat may be shifted to form the head board of the bed in the conversion of the structure for that function.

With the above and other objects in view, the invention consists in the convertible automobile seat structure and all equivalents.

In the drawings, in which like characters of reference indicate the same parts in the different views.

Figure 1:
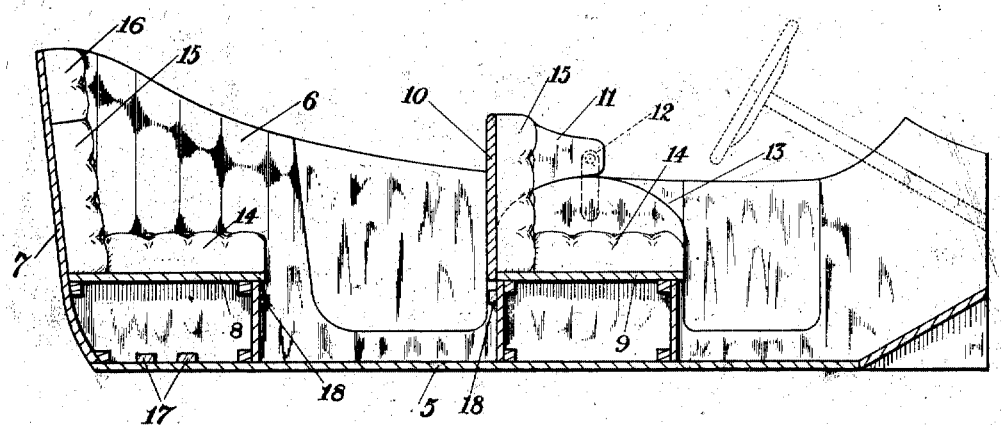
Figure 1 is a vertical longitudinal sectional view through an automobile body exemplifying the invention and showing the parts arranged in their normal seat forming relation.
Figure 2:
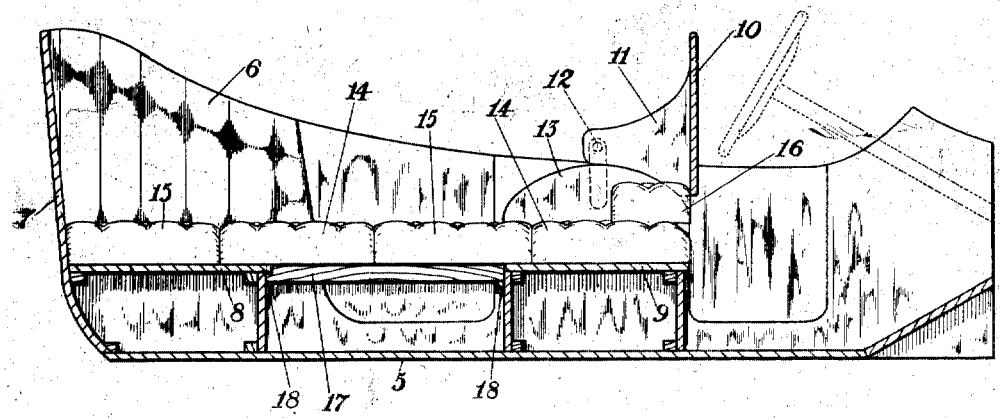
Fig. 2 is a view similar to Fig. 1 but showing the parts arranged as a bed.

Referring now more particularly to the accompanying drawings, there is provided an automobile body including the floor 5, the side walls 6 and the rear wall 7 which forms the back of the usual rear seat 8. This seat is of the usual box type to provide a storage compartment, as is also the conventionally positioned front seat 9. A back 10 is provided for the front seat, and this back is secured by forwardly extending wings 11 at its ends which are pivoted at their forward ends to upstanding members 12 on the body walls 6. Thus the back may be swung from its normal position, to a position at the front edge of the seat 9, whereby it may form the head board of a bed space defined by that portion of the car body rearwardly thereof. The sides of the wings 11 are concave and are adapted to rest, in either position of the back, on a seating shoulder 13 on the inner faces of the body walls 6. The seats 8 and 9 are provided with removable seat cushions 14 and the backs are provided with removable cushions 15, the lower ends of which rest on the seats between the backs and the rear edges of the seat cushions, to insure proper yielding action. A relatively narrow cushion 16 is positioned on top of the main rear seat cushion 15 and this narrow cushion is adapted to form a pillow in the use of the structure as a bed.

In forming the bed, slats 17 are provided which are adapted to extend between the seats and to support cushions disposed thereover, it being noticed that the combined widths of the cushions 14 and 15 are equal to the length of the bed space. The slats 17 are adapted to rest on seating blocks 18 on the adjacent sides of the seats, and when not in use they may be stored in the rear seat compartment.

An exceedingly simple convertible automobile body has thus been provided, which may be adapted for a bed from the normal position of its parts by merely swinging the front seat-back forwardly, positioning the slats and adjusting the cushions, and which may be as readily converted for its normal seating function. It is noted that when used as a bed the edges of the cushions are disposed in engaging relation to procure a continuous bed surface, in contradistinction to those types of structure wherein the seat-back or other portion is provided with a permanently attached cushion and is shiftable to form part of the bed.

What we claim as new and desire to secure by Letters Patent is:

In an automobile convertible for sleeping purposes, a front seat and a rear seat, a back for the front seat having wings at its ends pivotally connected to the body walls, a seating shoulder on the inner faces of the body walls adapted to have the wings rest thereon in either position of the back, removable cushions for the front and rear seats, supporting means between the front and rear seats for completing with them a flat support for the cushion to constitute a bed with the back of the front seat and the back of the rear seat forming a headboard and footboard for the bed.

In testimony whereof we affix our signatures in presence of two witnesses.

JOSEPH J. O'MALLEY.
KATHERINE O'MALLEY.

Witnesses:
R. S. C. CALDWELL,
H. D. CHASE.